United States Patent
Johansen et al.

(10) Patent No.: US 8,806,092 B2
(45) Date of Patent: Aug. 12, 2014

(54) CONTROL SYSTEM FOR A SUBSEA INSTALLATION

(75) Inventors: John A. Johansen, Kongsberg (NO); Vidar Sten-Halvorsen, Kongsberg (NO)

(73) Assignee: FMC Kongsberg Subsea AS, Kongsberg (NO)

( * ) Notice: Subject to any disclaimer, the term of this patent is extended or adjusted under 35 U.S.C. 154(b) by 0 days.

(21) Appl. No.: 10/590,260

(22) PCT Filed: Feb. 17, 2005

(86) PCT No.: PCT/NO2005/000058
§ 371 (c)(1),
(2), (4) Date: Aug. 18, 2006

(87) PCT Pub. No.: WO2005/081077
PCT Pub. Date: Sep. 1, 2005

(65) Prior Publication Data
US 2007/0173957 A1    Jul. 26, 2007

(30) Foreign Application Priority Data
Feb. 20, 2004    (NO) .................................... 20040770

(51) Int. Cl.
*G06F 13/12* (2006.01)
*G06F 13/38* (2006.01)

(52) U.S. Cl.
USPC .......................................................... 710/62

(58) Field of Classification Search
USPC .......................................................... 710/62
See application file for complete search history.

(56) References Cited

U.S. PATENT DOCUMENTS

| | | | |
|---|---|---|---|
| 3,894,560 A | 7/1975 | Baugh | |
| 5,166,677 A | 11/1992 | Schoenberg | |
| 5,469,150 A * | 11/1995 | Sitte | 340/3.42 |
| 5,941,966 A | 8/1999 | Gotze et al. | |
| 5,974,351 A * | 10/1999 | Croft et al. | 701/48 |
| 6,006,338 A * | 12/1999 | Longsdorf et al. | 713/340 |
| 6,553,336 B1 * | 4/2003 | Johnson et al. | 702/188 |
| 6,595,487 B2 | 7/2003 | Johansen et al. | |
| 7,017,072 B1 * | 3/2006 | Barrenscheen et al. | 714/4 |
| 7,170,238 B2 * | 1/2007 | Adamson et al. | 315/293 |
| 7,218,892 B2 * | 5/2007 | Beierle | 455/13.4 |
| 7,349,479 B2 * | 3/2008 | Suganuma et al. | 375/257 |
| 2003/0006070 A1 | 1/2003 | Dean | |
| 2004/0158781 A1 * | 8/2004 | Pihet | 714/712 |

FOREIGN PATENT DOCUMENTS

| | | |
|---|---|---|
| CN | 1466023 A | 1/2004 |
| EP | 0 671 675 A2 | 9/1995 |
| EP | 0 794 624 A2 | 9/1997 |

(Continued)

OTHER PUBLICATIONS

"Microsoft Computer Dictionary", Fifth Edition, p. 298.*

(Continued)

*Primary Examiner* — Chun-Kuan Lee

(57) ABSTRACT

The invention relates to a control system for a subsea installation based on CAN bus technology. A single cable forms a backbone for transmitting signals and/or power from a central control unit to a number of devices or sensors on the installation. Terminals are attached to the cable at intervals, allowing devices to be plugged in while the system is operable. A termination may also include repeaters or amplifiers for transmitting signals over longer distances.

2 Claims, 6 Drawing Sheets

(56) References Cited

FOREIGN PATENT DOCUMENTS

| | | |
|---|---|---|
| EP | 1 415 862 A1 | 5/2004 |
| GB | 2 332 220 A | 6/1999 |
| NO | 313677 B3 | 12/2000 |
| WO | WO 99/14643 A1 | 3/1999 |
| WO | WO 02/46577 A1 | 6/2002 |
| WO | WO 02/054163 A1 | 7/2002 |

OTHER PUBLICATIONS

Profibus Nutzerorganisation—"Profibus Technical Description Sep. 1999", Profibus Brochure-Order No. 4.002 (Sep. 1999).

Schneider Electric—"Seriplex Intelligent Wiring System", Document No. XP-002351126 (Dec. 2000).

Scheibel, Klaus—"An einem Strang", Der Zuliefermarkt, pp. 32-34 (Nov. 1997).

* cited by examiner

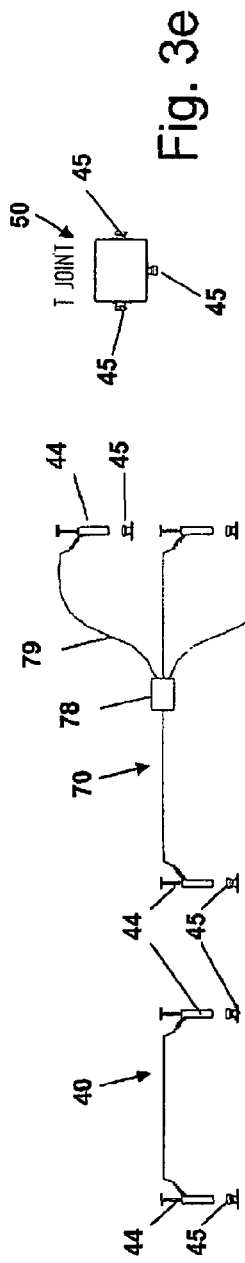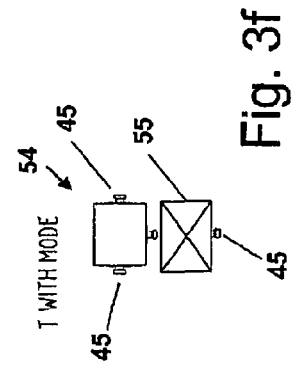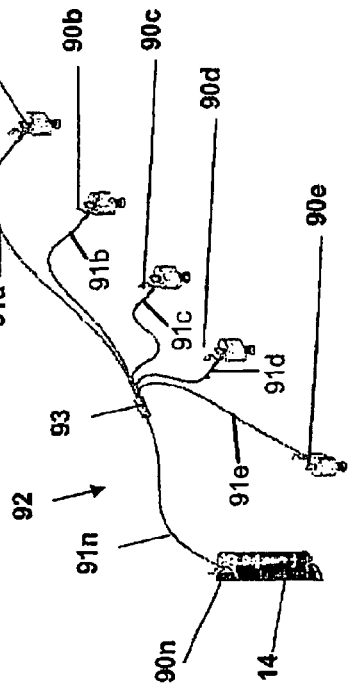

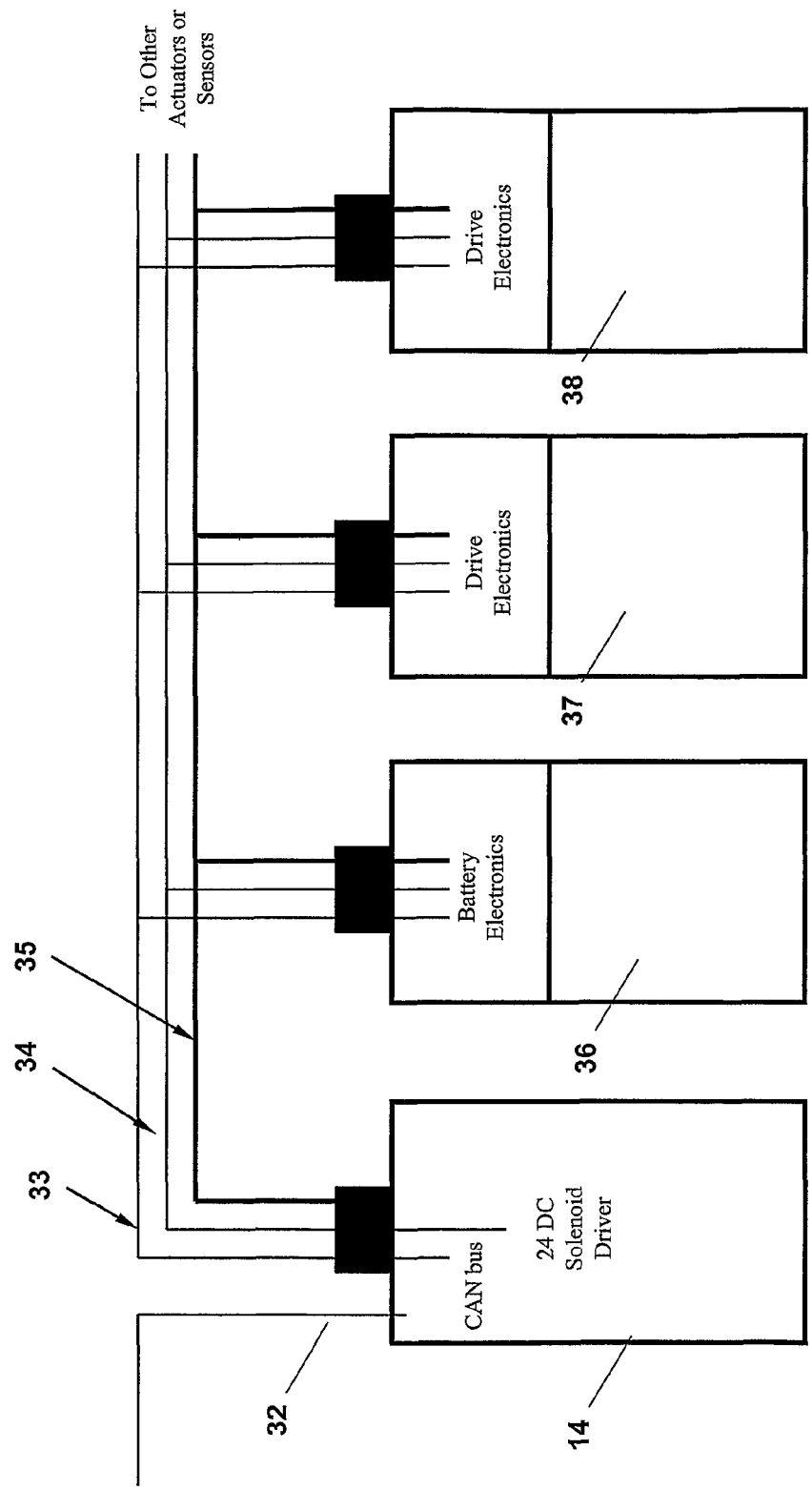

CONTROL SYSTEM FOR A SUBSEA INSTALLATION

TECHNICAL FIELD

The present invention relates to the field of subsea control systems.

More particularly, the invention relates to a control system for controlling a plurality of devices in a subsea installation, the devices being connected to at least one common bus.

BACKGROUND OF THE INVENTION

A standard subsea installation comprises a mixture of hydraulically and electrically operated devices. The hydraulic devices are normally actuators for the operation of valves on the installation. The actuators may be controlled by electrically operated pilot valves that in its turn control control valves, all housed in a control module located at or near the well, the control valves directing the supply of fluid to each actuator, as dictated by the need for operation. Such a system is therefore called an electro-hydraulic system. In addition, injection valves for supplying chemicals may be needed and such valves are usually electric solenoid operated valves. Other devices are electrical of nature, such as sensors for monitoring various parameters in system, such as pressure and temperature, flow rates and sand and scale detectors. These usually communicate with the control system module via a dedicated cable, each sensor being connected separately to the control module, for receiving and transmitting signals and, in some cases, electric power.

The standard control module used in today's systems is housed in a container filled with an inert gas such as Nitrogen and pressurised at 1 bar to protect the electronics of the system. It contains the electronics for receiving signals from the sensor devices and for transmitting signals to a control station at a production vessel, such as a floating production storage and offloading vessel (FPSO), or other remote location. All the electrical pilot valves are also housed in the control module. The supply lines for hydraulic and chemical fluids are connected to the control module with lines extending therefrom to the hydraulic actuators and the chemical injection points as needed. This system is very inflexible. For example, it must be decided beforehand how many control valves will be needed. If more control valves will be needed then the control module must be pulled up and exchanged with a new and larger control module. Such an action requires the well to be shut down, resulting in lost production. Usually the control module is made larger than needed in case the system needs to be extended.

It has been proposed to use directly electrically operated valves, using electric motors, as this will be simpler and eliminate the need for large and costly hydraulic actuators and the use of pilot valves, since the actuators can be directly controlled.

An all-electric system will eliminate the need for hydraulic piping that is used in today's subsea installation, resulting in considerable savings, since not only must the pipes be carefully mounted, but they also need to be extensively tested for leaks and flushed clean. Another advantage with an all-electric system is the possibility of a large degree of modularisation. Electrically powered actuators can be made small and compact and are connected to the control module with a cheap and simple cable.

In an all-electric system it will be possible to configure it as a local area network (LAN), as is well known in many technical areas. Each device may have its own controller unit with a unique address and the electronics in the control-module having a micro processor, a bus controller, a memory unit and an input signal controller. Examples of such systems are described in WO 9914643 and WO 02054163, and in U.S. Pat. No. 5,941,966. It will enable devices to be removed and/or added to the system without shutting the whole system down. Any new device may easily be registered in the central control module by remotely reprogramming the control module processor.

SUMMARY OF THE INVENTION

It is an object of the invention to provide a subsea control system that is wholly electric in nature and uses addressing technology to control any number of devices.

It is also an object of the invention to provide a subsea control system that is flexible and that can be extended or added upon indefinitely.

The control system according to the invention allows devices to be installed as necessary, thereby reducing the need for upfront expenditure. With batteries, sensors and actuators all on the same distribution harness, they can be independently retrieved and separately repairable.

According to the invention there is provided a control system for controlling a plurality of devices in a subsea installation, said devices being connected to at least one common bus, the control system comprising a command unit; each device comprising a control unit having a unique address and means for communicating with the command unit, and each device being removably connected to the common bus.

According to an embodiment of the invention, the common bus comprises at least one modular cable unit so that a variety of devices, such as motors, sensors, can be connected anywhere to the common bus.

The features of the present invention are set forth in the appended claims.

BRIEF DESCRIPTION OF THE DRAWINGS

The invention will now be described with reference to the accompanying drawings where

FIGS. 3a-3f are schematic drawings showing various components of the bus shown in FIG. 2.

FIG. 4 is a schematic drawing of a cable harness bus for use in a system according to the invention.

FIG. 5 is a schematic drawing illustrating the layout of the electrical cabling of the present invention.

DETAILED DESCRIPTION OF THE INVENTION

Figure 1:
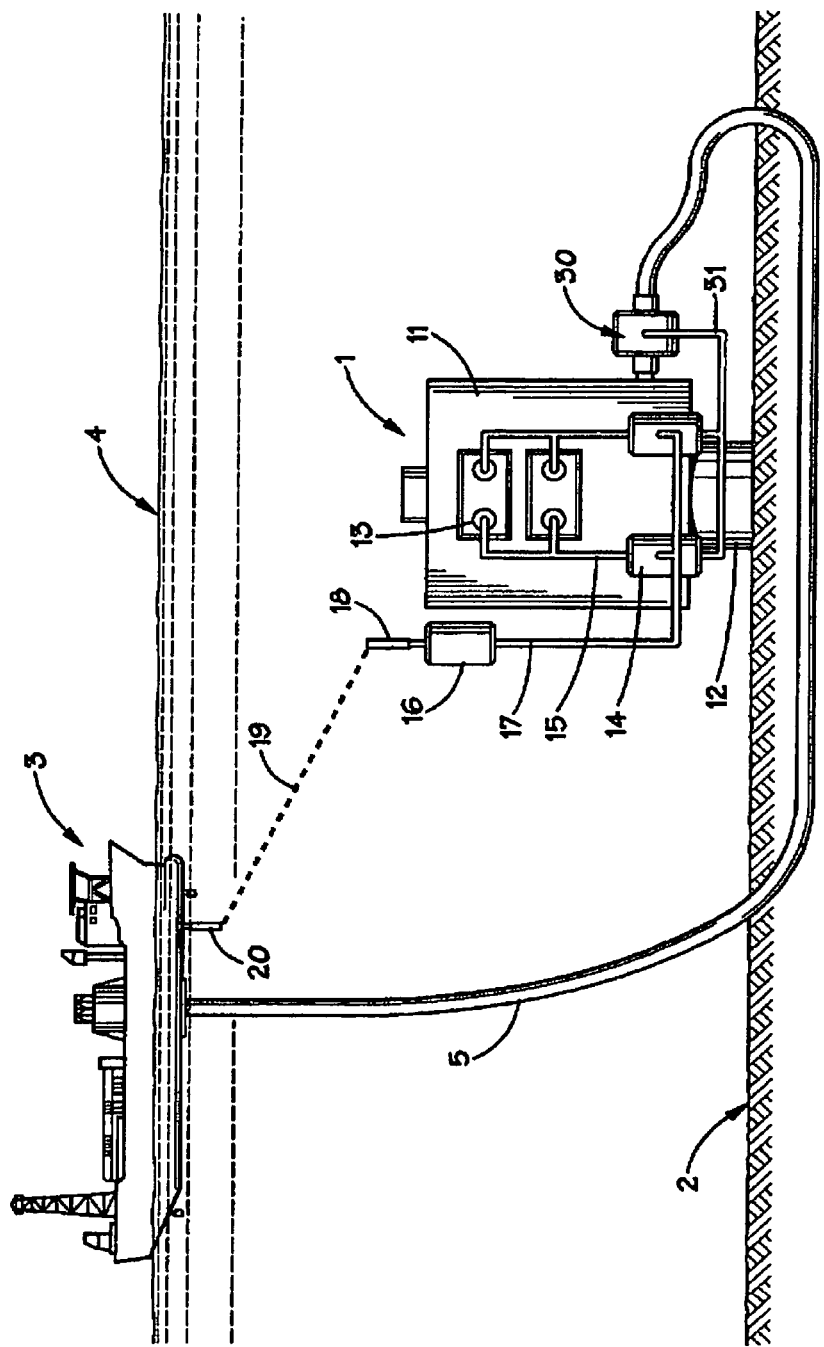
FIG. 1 is a drawing of a subsea installation which includes a control system according to the invention.

FIG. 1 shows an installation 1 located on the seabed 2 where the control system according to the invention may find use. In this illustrative embodiment, the installation 1 comprises a Christmas tree or other subsea production equipment 11 mounted on a wellhead 12, the wellhead being the top part of a well that extends down into the ground below the seabed 2. A vessel 3, such as a floating processing unit (FPU), is located on the surface 4 of the water. The Christmas tree includes a number of devices, such as sensors, meters, or actuators 13 for the actuation of valves (not shown). A control module 14 is attached to the Christmas tree, the control module housing electronic equipment for receiving signals from and transmitting signals and power to the actuators 13. A cable 15 extends from the control module 14 to each device or actuator. Other equipment, such as sensors or meters, may also be connected to the control module. A flowline 5 extends from the installation 1 down to the vessel 3. A local power generating subsystem 30 may be arranged between the flow outlet of the installation 1 and the inlet of the flowline 5 to supply electrical power to the various components of the system. A power cable 31 connects the power generating subsystem with the control module 14.

The installation may further comprise a hydro-acoustic communication unit 16 attached to the Christmas tree and connected to the control module 14 via cable 17.

The communication unit 16 may also include an acoustic antenna 18, arranged for communicating with a corresponding acoustic antenna 20 connected to a telemetry transceiver on the vessel 3. This arrangement provides a telemetry and control signal link 19 between the vessel and the subsea installation 1.

The control module 14 also comprises an intelligent processor that controls the electronics in the system and handles communication signals both within the system and from remote locations.

The control module 14 receives instructions and power through a cable 32 that is connected to a remote source. In one illustrative embodiment shown in FIG. 5, the primary electric power is provided by a battery unit 36, which may be installed in the control module 14 or in another suitable location proximate to the installation 1.

In an illustrative embodiment, each device or actuator 13 may be a self-contained module that can be retrieved to the surface for repair or replacement. Other installations where the invention may find utility include, but are not limited to, manifolds, subsea processing systems, workover control systems, or any remote system where a number of controllable devices are in use.

Figure 2:
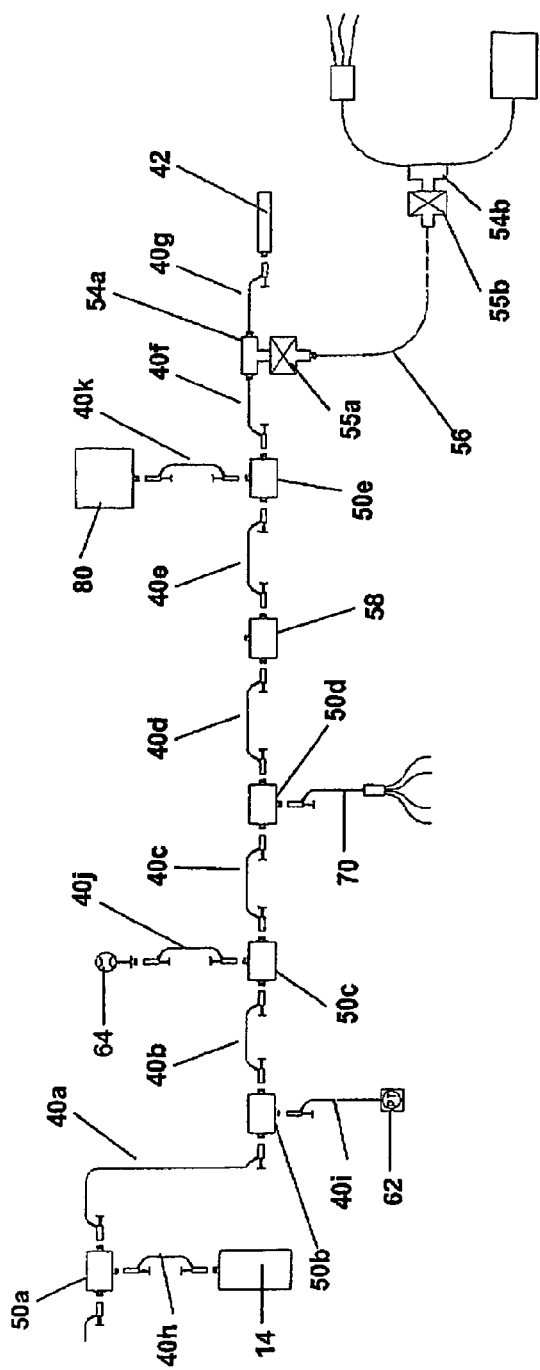
FIG. 2 is a schematic drawing of a cable backbone bus for use in a system according to the invention.

FIG. 2 is a schematic drawing showing a first illustrative embodiment of a bus connection for use in the system according to the invention. In this embodiment, the bus comprises a number of parts that may be assembled to form the installation.

FIGS. 3a-3f are schematic drawings showing various components of the bus shown in FIG. 2.

As can be seen in FIGS. 3a-3f, the system comprises a number of parts or bus units that in various configurations may be assembled into a backbone cable structure comprising the bus connection. In the simplest case, only two basic units are necessary to form the backbone, as shown in FIG. 3a. In FIG. 3a, the first unit is a cable section 40. Each cable section 40 includes electrical connectors 44 at each end that can mate with corresponding, complementary connectors 45. Each cable section 40 comprises at least a power line and a signal line. Each cable section 40 may preferably be chosen from a number of uniform lengths for easier manufacture. As illustrated in FIG. 3e, the second basic unit is a three-way distribution hub 50 having three connectors 45. As also can be seen from FIG. 2, the use of such distribution hubs 50 allows a cable to be daisy-chained throughout the installation and allows a branch cable to be connected into the main backbone system.

Other possible units are a two-way hub 58 with two connectors 45 (FIG. 3c), and a one-way or termination hub 42 having only one connector 45, which is intended to be used as an end termination of the backbone (FIG. 3d). Another example of a hub that may find use in the invention is three-way hub 54 (FIG. 3f), having a repeater 55 incorporated into the hub such that the bus can be extended to an installation remotely located from the main installation.

Another possible unit is a multi-outlet cable 70 (FIG. 3b). This comprises a splitter 78 that splits the cable into several branches 79 and allows several devices to be connected into the system with only one connector.

Referring again to FIG. 2, it is shown an illustrative embodiment of a bus connection system according to the invention. The backbone cable bus comprises a plurality of essentially interchangeable cable sections 40a, 40b . . . 40g. Disposed between each adjacent pair of cable sections are hubs such as three-way electrical hubs 50a, 50b. 50c, 50d, 50e or two-way extension hub 58, as explained above with reference to FIGS. 3a-3f. Each three-way hub facilitates the connection of a device or module such as a sensor, meter, or actuated device, as described further below These devices are connected into the backbone with the same cable units 40, shown at 40h, 40i, 40j, 40k. As shown, if there is no need to connect a module or device at a particular hub, a two-way extension hub such as 58 may be used. A two-way hub 58 may be removed and replaced by another three-way hub 50 at a later time, whenever it is desired to add a new device or module to the bus. Alternatively, instead of a two-way hub, another three-way hub may be used, with a blanking plug in the third connector. The last cable section in the backbone cable bus is connected to a one-way or termination hub 42.

It should be noted that the modules or devices may include electronics which enable them to function as terminations. However, it is preferred to terminate the bus in a special termination hub 42 as shown. This allows the cable to be "daisy-chained" throughout the installation and forming the backbone. If at a later date it will be necessary to extend the system the termination can be replaced by a junction box and new cables added as needed.

The control module 14 may be located anywhere on the system.

FIG. 2 also shows a pressure/transmitter sensor 62 connected to the backbone via the cable 40i. Another sensor, for example a flowmeter 64, is likewise connected to the backbone via cable 40j.

It is preferred to locate the male connectors 44 on the cables, but the cables may instead have female instead of male electrical connectors, the junction boxes having the corresponding male connectors FIG. 2 also shows an example of a satellite extension. Another installation located at some distance away from the main installation can be connected with an extension cable 56. The larger step out distance makes it necessary to install a repeater or a modem to allow signals to travel a larger distance. The hub 54a is connected to or includes a repeater 55a which is further connected to the extension cable 56. The far end of the cable 56 is connected to another repeater 55b connected to or included in the hub 54b. This arrangement allows signals and power to be transmitted to the hub 54b at a considerable distance from the main installation. The hub 54b may form the start of a new backbone cable, similar to the one above, and enabling this sub-system to be operated from the control module 14.

The power for running the electrical devices may be supplied by one or more batteries housed in the control module. Alternatively, the power may be supplied through an umbilical from a remote location. Instead of being housed in the control module, the batteries may be independently retrievable units connected to the backbone in the same manner as described above.

Another illustrative embodiment is shown in FIG. 4, wherein the bus comprises a harness unit 92 that is similar in nature to the multi-outlet cable 70 described with reference to FIG. 3b above. However, instead of a splitter, the harness unit 92 includes a junction 93 that comprises wiring enabling all branches to be in electrical communication with each other, as will be described in more detail later. Each branch 91a, 91b . . . 91n terminates in an electrical connector 90a, 90b . . . 90n, that in turn may be connected to devices. In the embodiment shown in FIG. 4 there are five branches on one side and one branch on the other side, but there may be any number of branches on both sides. Several harness units 92 may be connected together in a daisy-chain arrangement, enabling the bus to be extended as necessary. The bus distributes both power and control signals.

Each electrical connector may be connected to a corresponding module or device. The various modules or devices may include, but are not limited to, actuators, (13a, 13b), sensors (62), meters (64), control modules (14), additional junctions, or any other devices which may have utility in a subsea installation.

FIG. 5 is a schematic block diagram showing an illustrative embodiment of the invention, wherein a number of modules or devices are interconnected by a bus. In this illustrative embodiment, the system comprises a control module 14, a battery module 36, and actuator modules 37 and 38. Each module is connected to CAN-bus driver or control line 33 and power supply lines 34 and 35.

Figure 7:
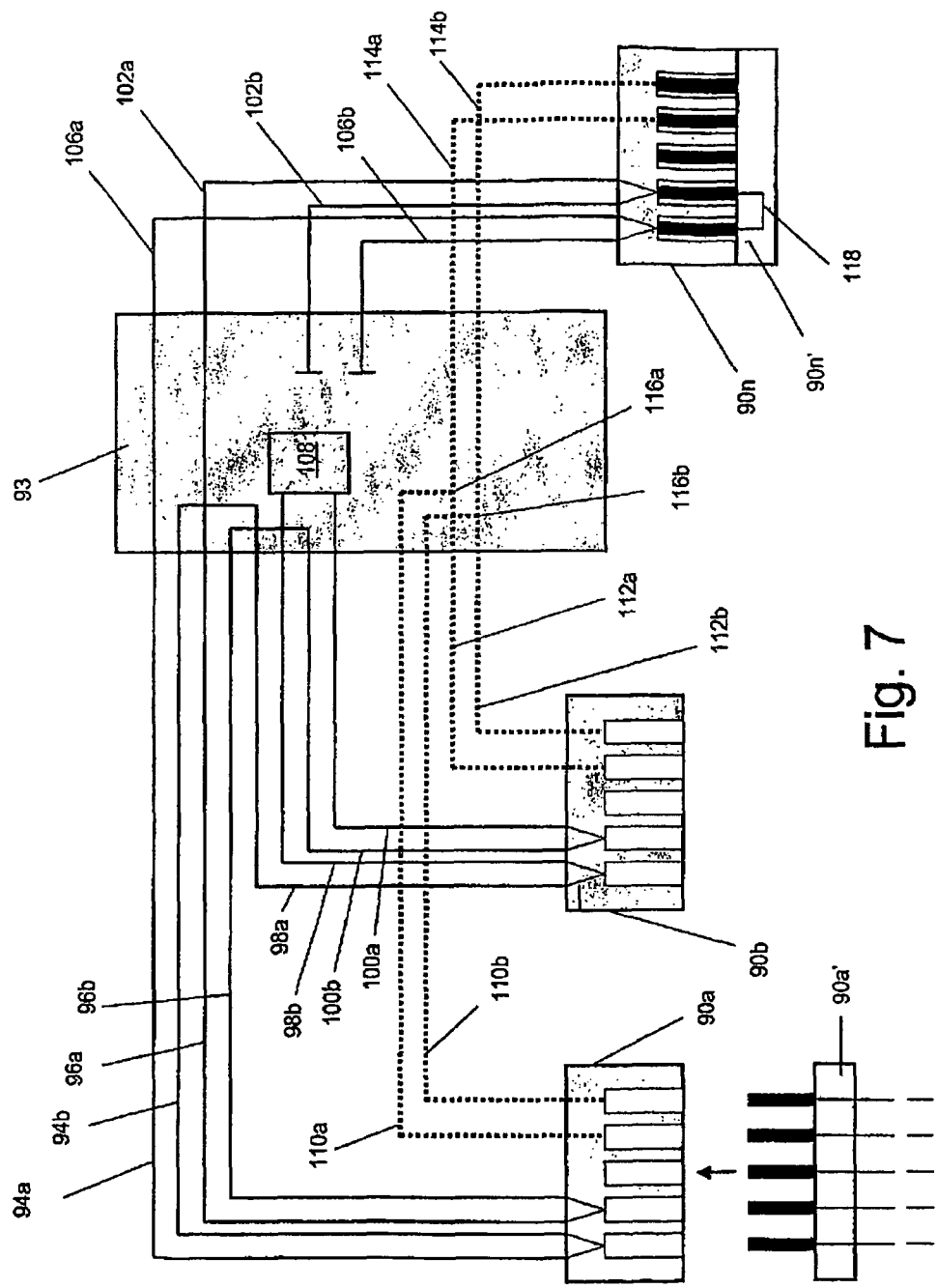
FIG. 7 is a more detailed schematic drawing of the cable harness bus shown in FIG. 4.

FIG. 7 is a schematic block diagram showing one possible wiring layout for the cable harness bus shown in FIG. 4. It will be understood by those skilled in the art that in the interest of clarity a number of details have been omitted from FIG. 7. In this illustrative embodiment, the system comprises a junction 93 and electrical connectors 90a, 90b and 90n connected to the junction. Each of the electrical connectors is connectable to a device or module of any of the various types described above with respect to FIGS. 2 and 4. Complementary connectors such as 90a' and 90n' are associated with the modules and connected to the electrical connectors in a manner well known in the art.

Each electrical connector is connected to the junction 93 via a plurality of lines, wires or cables, which communicate control signals and or electrical power to the electrical connectors, and thus to the individual modules. In the illustrated embodiment, there are six lines, wires or cables extending from the junction 93 to each electrical connector. For each connector, two lines comprise a control signal supply, two lines comprise a control signal return, one line comprises a power supply, and one line comprises a power return. It should be understood that in other embodiments, any number of control or power lines may utilized without departing from the spirit and scope of the invention.

Specifically, control supply lines 94a and 94b extend from junction 93 to connector 90a. Lines 94a and 94b are electrically connected to each other at the electrical connector 90a. Similarly, control return lines 96a and 96b extend from junction 93 to connector 90a. Lines 96a and 96b are also electrically connected to each other at the electrical connector 90a. Finally, power supply line 110a and power return line 110b extend from junction 93 to electrical connector 90a.

Control supply lines 98a and 98b extend from junction 93 to connector 90b. Lines 98a and 98b are electrically connected to each other at the electrical connector 90b. Similarly, control return lines 100a and 100b extend from junction 93 to connector 90b. Lines 100a and 100b are also electrically connected to each other at the electrical connector 90b. Finally, power supply line 112a and power return line 112b extend from junction 93 to electrical connector 90b.

Control supply lines 106a and 106b extend from junction 93 to connector 90n. Lines 106a and 106b are electrically connected to each other at the electrical connector 90n. Similarly, control return lines 102a and 102b extend from junction 93 to connector 90b. Lines 102a and 102b are also electrically connected to each other at the electrical connector 90n. Finally, power supply line 114a and power return line 114b extend from junction 93 to electrical connector 90n. In this particular embodiment, electrical connector 90n is a termination point. The corresponding complimentary connector 90n' is not associated with a module. Connector 90n' includes a load resistor 118 across the control supply and return lines to balance the system impedance.

As can be seen in FIG. 7, the control signal supply and return lines are each arranged in a respective continuous circuit which passes through each electrical connector. Within the junction 93, supply line 98b and return line 100a are connected across load resistor 108, which also serves to balance the system impedance. Return line 100a is connected to return line 100b at electrical connector 90b. Return line 100b is connected to return line 96b within junction 93. Return line 96b is connected to return line 96a at electrical connector 90a. Return line 96a is connected to return line 102a within junction 93. Return line 102a is connected to return line 102b at electrical connector 90n. Finally, return line 102b terminates within junction 93.

Supply line 98b is connected to supply line 98a at electrical connector 90b. Supply line 98a is connected to supply line 94b within junction 93. Supply line 94b is connected to supply line 94a at electrical connector 90a. Supply line 94a is connected to supply line 106a with junction 93. Supply line 106a is connected to supply line 106b at electrical connector 90n. Finally, supply line 106b terminates within junction 93.

The continuous routing of the control signal supply and return lines through the electrical connectors ensures that the control signals will not be interrupted or degraded even when one or more modules are removed from the system. In this way the illustrated system is provided with "plug and play" functionality. The configuration also results in short stub lengths in the signal network.

Power supply lines 110a, 112a, and 114a are all connected at a power supply node 116a within junction 93. Similarly, power return lines 110b, 112b, and 114b are all connected at a power return node 116b within junction 93. The illustrated routing of the power supply lines provides the shortest possible path for the power current, thus minimizing resistive line losses.

Referring again to FIG. 5, each module 14, 36, 37, 38 includes a communication unit or bus controller that communicates according to the protocol on the control line 33. This may be a controller area network (CAN) bus or any other suitable bus communication protocol. In order to enable communication, the communication unit comprises a microprocessor or other data processing arrangement which is operatively controlled by executable code, including bus driver code, which is included in a memory. If a CAN-bus is used, the bus controller would be a CAN-bus controller and the bus driver would be a CAN-bus driver. The memory unit may comprise random access memory (RAM), programmable read-only memory (PROM), erasable programmable read-only memory (EPROM), electrically erasable programmable read-only memory (EEPROM), or any other suitable type of memory unit. Clearly, other bus types can be employed. In other embodiments the memory unit may be reprogrammable from a remote location to facilitate upgrades and/or extensions of the system.

When an action is initiated by the bus controller, the controller generates a message which includes a unique identifier or address for a particular module, and broadcasts this message on the bus. Each module scans the bus for any messages containing its particular address. Upon receiving'such a message, a particular module may acknowledge the message, respond with any requested information, and/or perform a function according to the instructions in the message. When the command is successfully completed, a reply message may be issued by the module to report the status of the module or completion of the command. This reply message may then be acknowledged by the controller unit, thus completing the control sequence.

Figure 6:
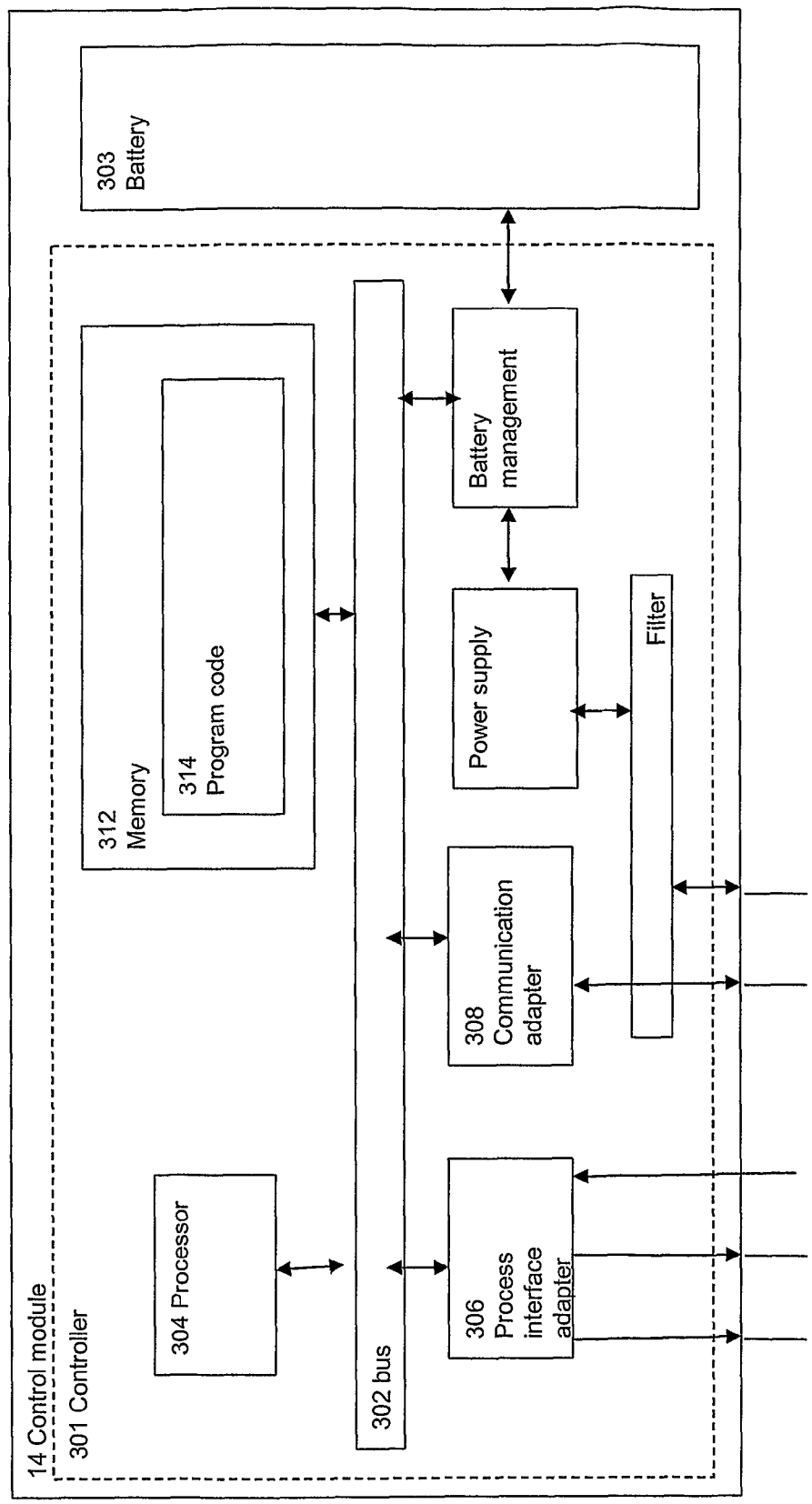
FIG. 6 is a schematic block diagram illustrating a control module.

FIG. 6 is a schematic block diagram further illustrating one possible embodiment of the control module. The control module 14 may comprise a controller 301 and a battery 303, which may be independently disconnectable during operation. In another embodiment the controller 301 and the battery 303 may be permanently embedded in a single control module 14. The controller 301 (indicated by dotted line) may be based on known processor bus architecture, and may comprise an internal bus 302 which connects a microprocessor 304 and a memory unit 312. The memory unit 312 may comprise program code preferably held in a non-volatile memory such as Flash or EPROM, and data preferably held in a volatile memory such as RAM, respectively.

The bus 302 may be further connected to a CAN bus adapter 306. The CAN bus adapter may comprise an interface between the internal bus 302 and the CAN bus, providing communication between the processor and the modules. In particular, the CAN bus adapter 306 may comprise input circuits for receiving sensor input, output circuits for providing appropriate actuator control signals, and input/output circuits for providing two-way communication with a remote station. The bus 302 may be further connected to a timer device (not illustrated).

In one illustrative embodiment, the control module 14 further comprises a rechargeable battery 303. The battery provides electrical power for the operation of the internal components of the control module, as well as control signals and power for the valve actuators. The battery also provides electrical power to any sensors and meters present in the installation. The battery 303 may normally be charged by power transferred from the remote station. Alternatively, a local power generator propelled by the flow output from the subsea installation (as indicated by 30 in FIG. 1) may be employed as the primary energy source.

The control module has a programmable processor and is arranged to receive new software downloaded from the remote control station through the communication cable and the communication adapter 308. This allows the control module to be dynamic and to be updated to reflect changes, such as for example new sensors and new actuators.

Figure 8:
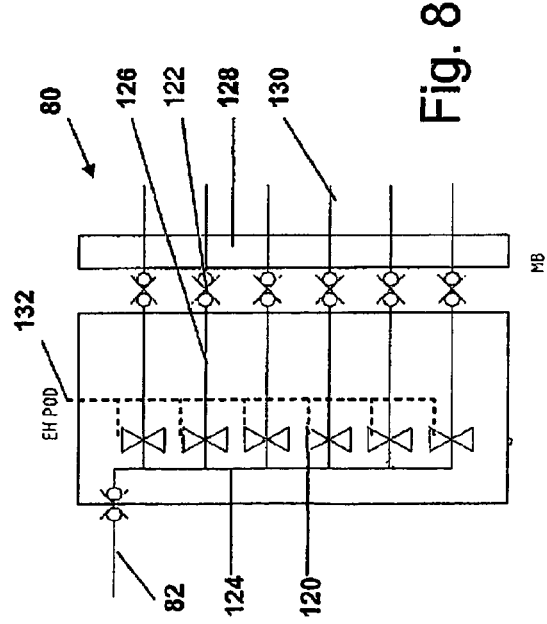
FIG. 8 is a drawing of an electro-hydraulic pod module.

While the embodiments described above contemplate a system where each module receives only electrical control signals and electrical power, in other embodiments it may be necessary to provide certain components of the system with hydraulic control signals or power. To this end, in an additional embodiment of the invention as shown in FIG. 8, one or more of the modules may comprise an electro-hydraulic pod 80. The pod 80 may include one or more control valves such as 120. A hydraulic supply line 82 may be connected to one side of the pod, and distributed to one or more hydraulic input lines 124 which are routed to the control valves 120 within the pod 80. On the other side of the valves, the hydraulic output lines 126 terminate in one or more hydraulic couplings such as 122. An MQC (Multiple Quick Connectors) plate 128 comprises one or more complementary couplings which engage the hydraulic couplings 122 when the MQC plate is attached to the pod 80. One or more hydraulic lines 130 extend from the MQC plate 128 to power one or more hydraulically operated devices, such as a valve actuator (not shown).

In this embodiment the pod 80 comprises six control valves such as 120, with six corresponding input lines and six corresponding output lines. The six control valves may be used to control six hydraulic actuators or other hydraulically operated devices. It will be well understood by those skilled in the art that any number of control valves may be provided in pod 80, in order to meet the requirements of a particular installation. Pod 80 is provided with at least one electrical connector 132 for receiving a cable such as cable 40, in order to connect the pod 80 to the bus.

The invention claimed is:

1. A control system for a subsea installation which comprises:
    a control module;
    a common bus which is connected to the control module and which comprises at least one cable unit; and
    a plurality of devices which are each removably connectable to the cable unit;
    wherein each one of the devices comprises a bus controller having a unique address;
    wherein the control module comprises means for communicating with each one of the devices over the common bus;
    wherein said cable unit comprises a junction and a plurality of branch cables, each of the plurality of branch cables comprising a first end which is connected to the junction, a second end which is connected to a corresponding electrical connector that in turn is removably connectable to one of the devices, and at least two control signal supply cables which each extend between said first and second ends and are connected to said junction and said corresponding electrical connector; and
    wherein said control signal supply cables are directly electrically connected to each other at said corresponding electrical connector.

2. A control system according to claim 1, wherein each of said branch cables further comprises at least two control signal return cables which extend between said first and second ends and are connected to said junction and said corresponding electrical connector.

* * * * *